June 1, 1926.
R. B. JOHNSTON ET AL
1,586,749
NUT SHELLING APPARATUS
Filed July 10, 1925
7 Sheets-Sheet 1
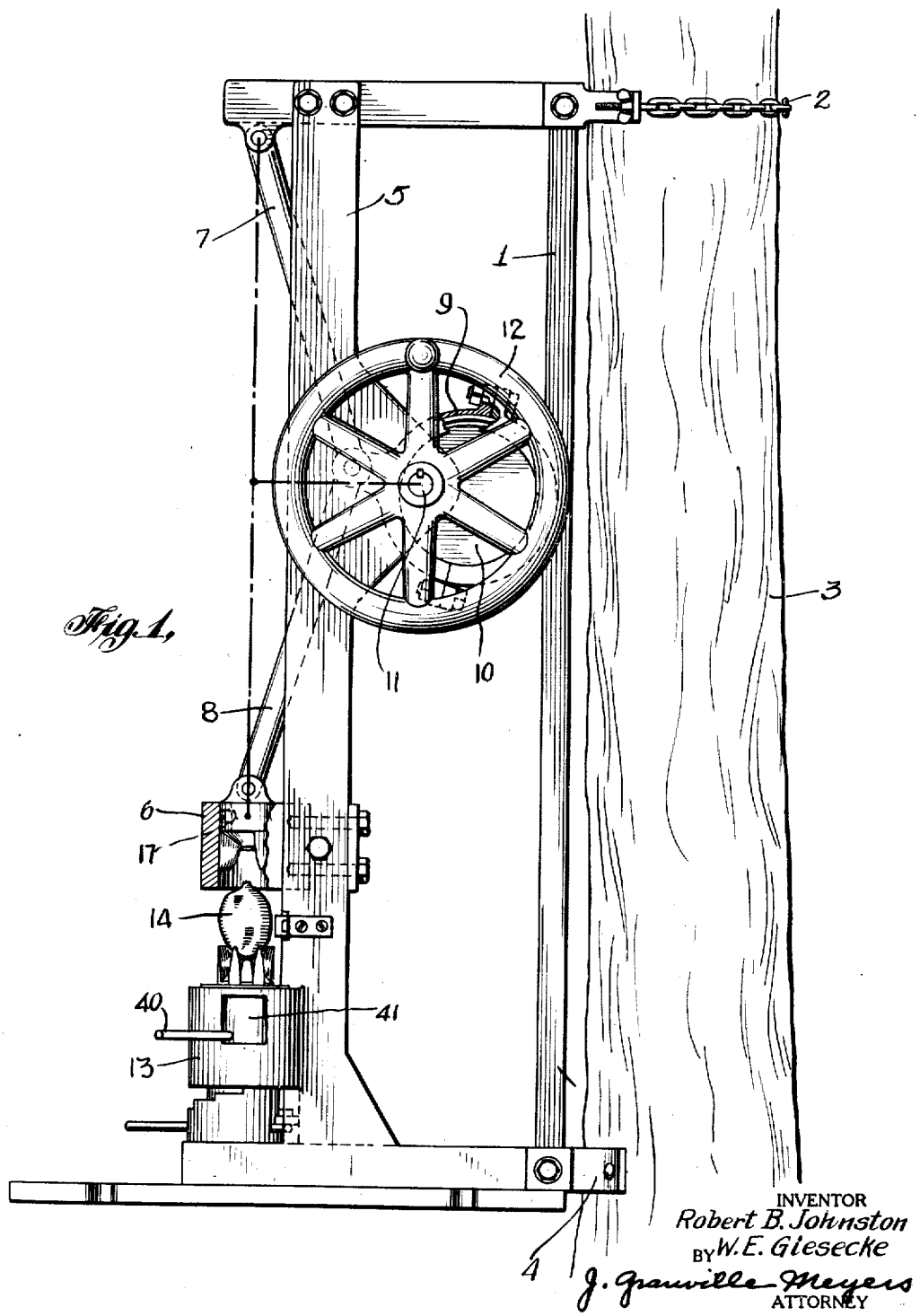
Fig.1,
INVENTOR
Robert B. Johnston
BY W. E. Giesecke
J. Granville Meyers
ATTORNEY

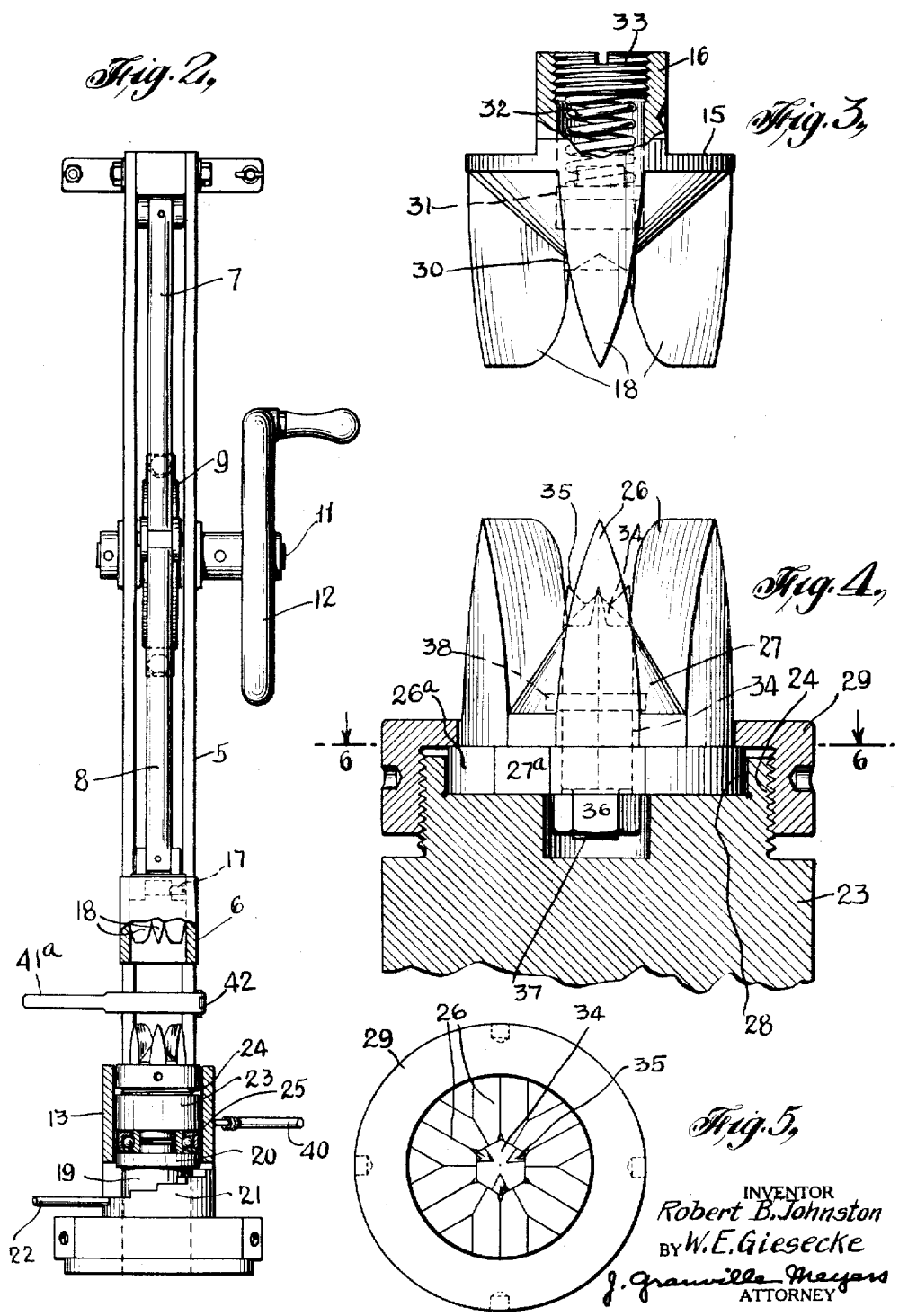

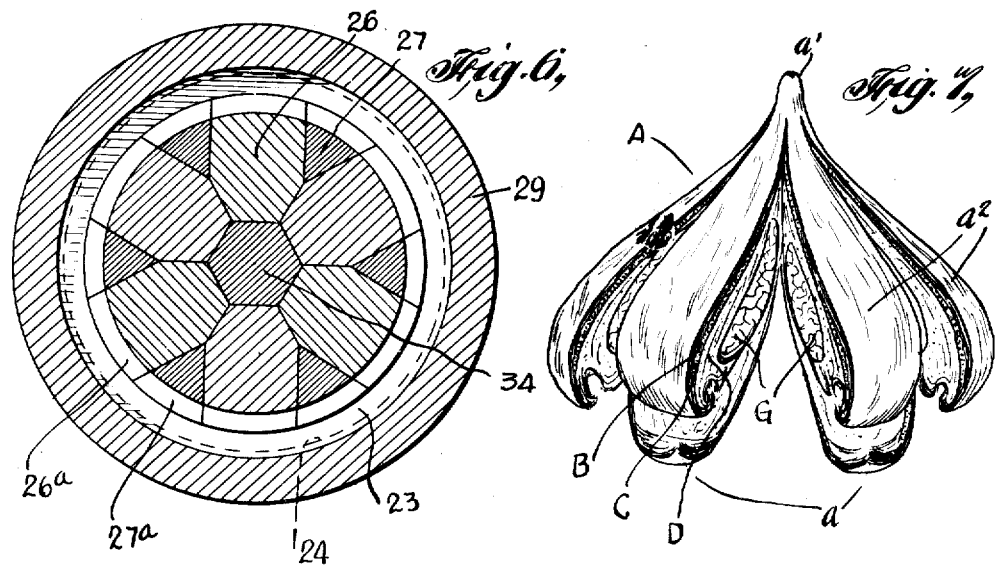
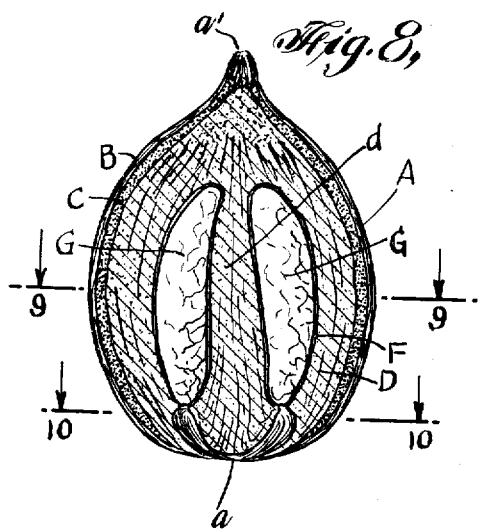
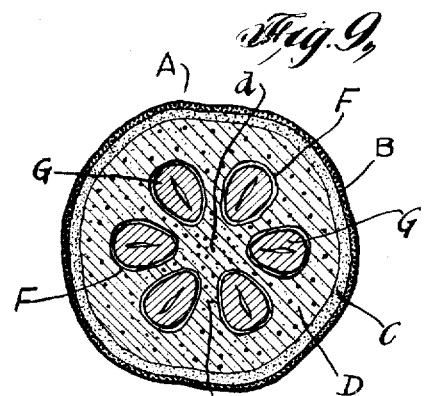
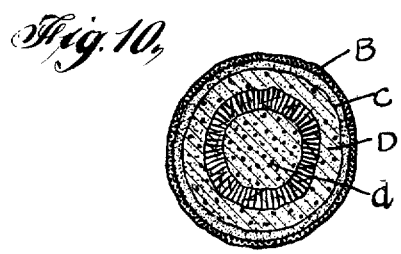
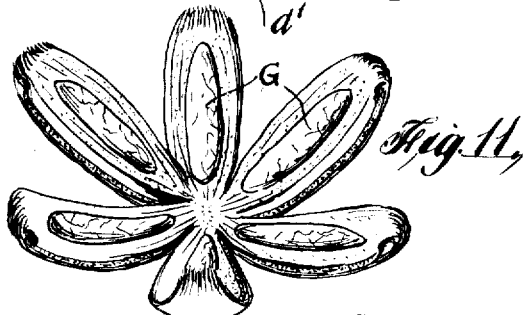

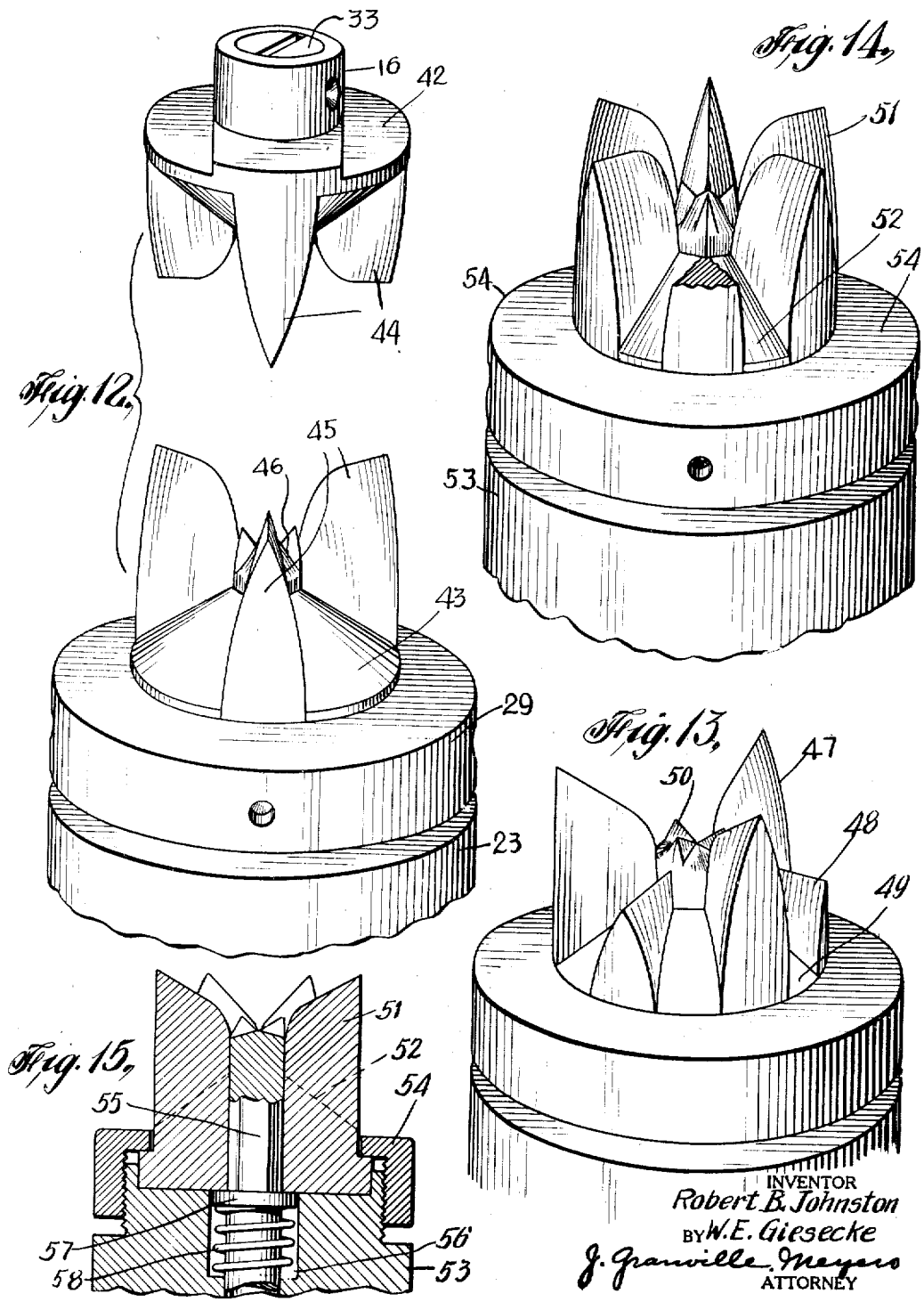

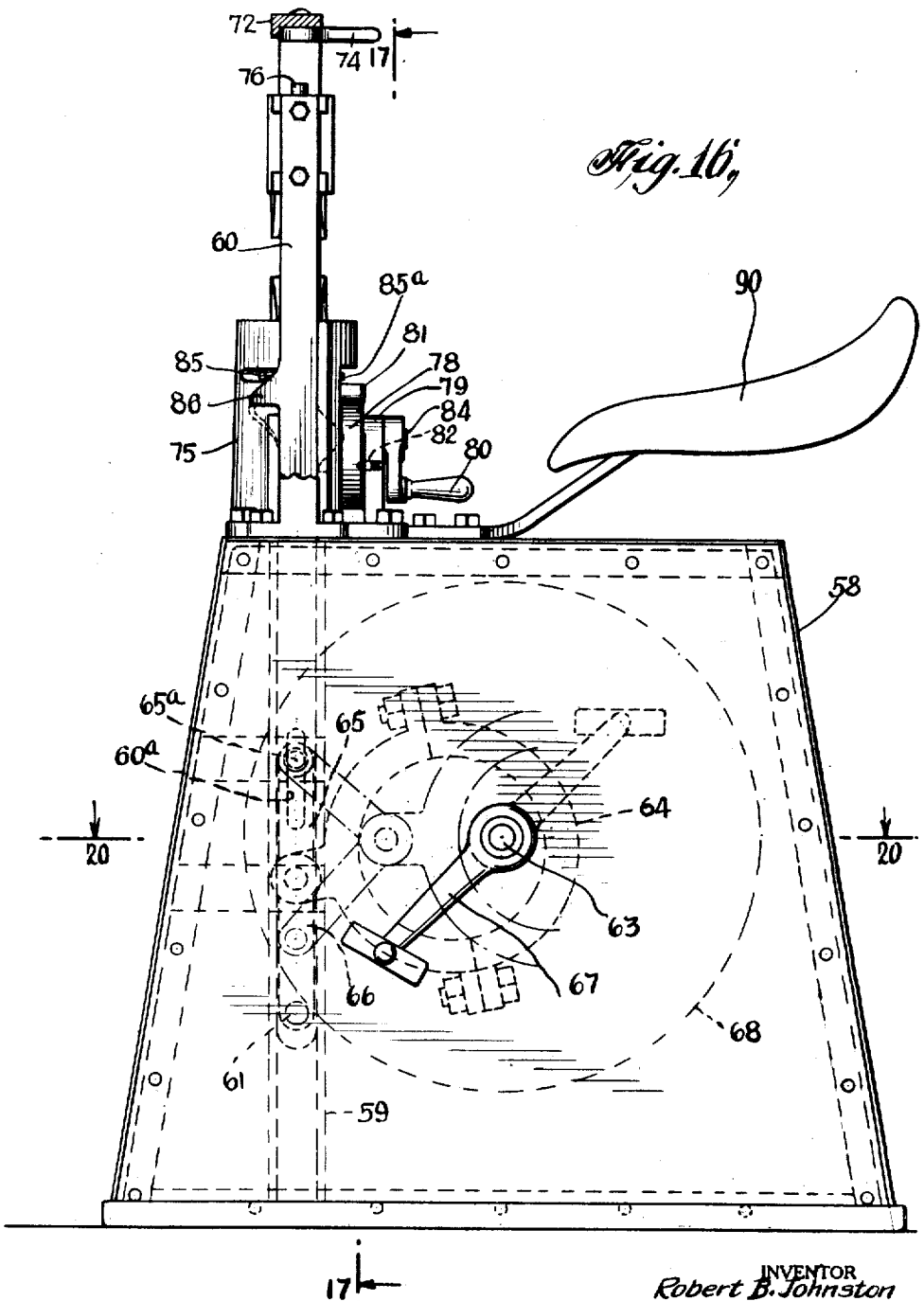

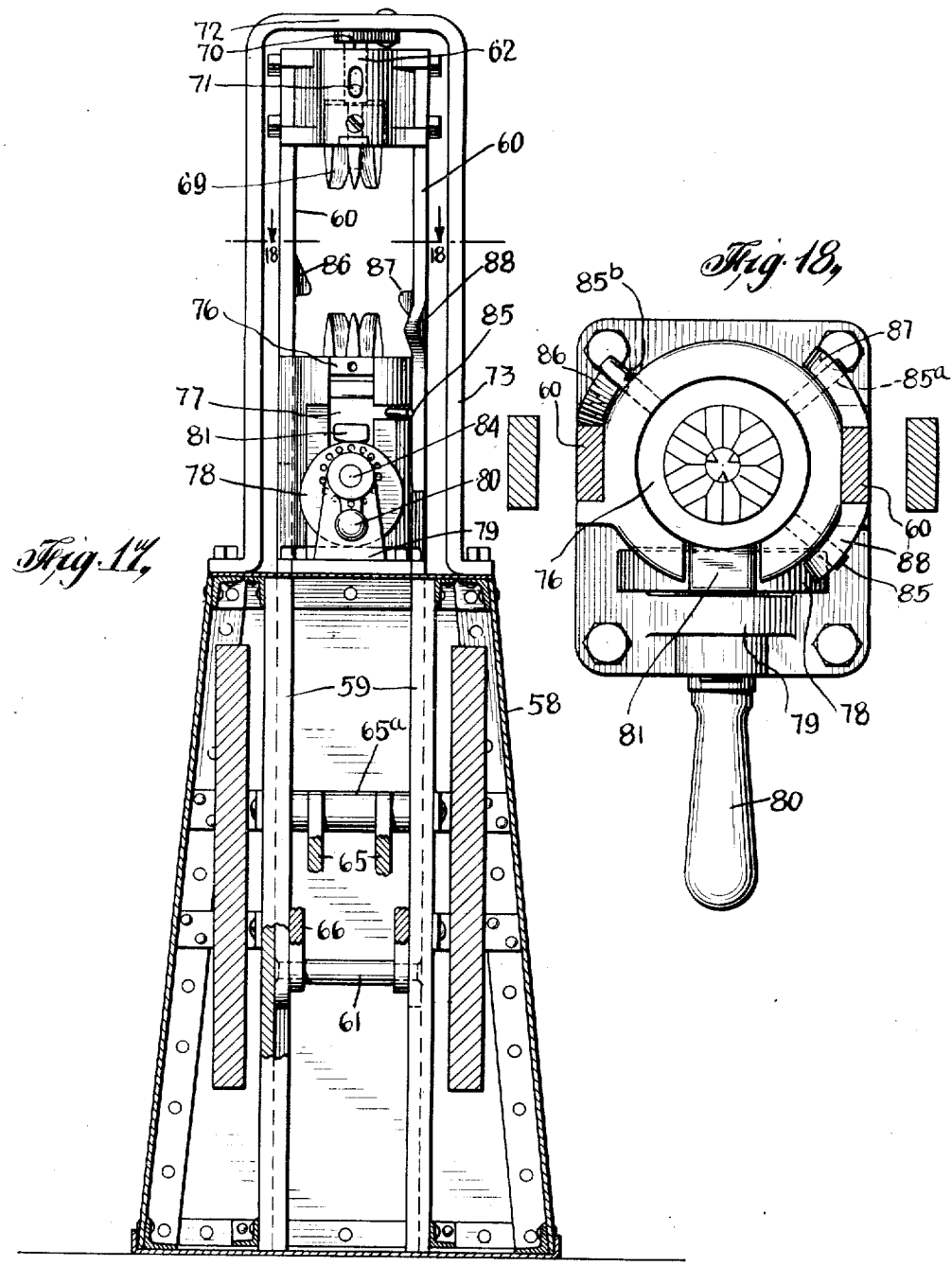

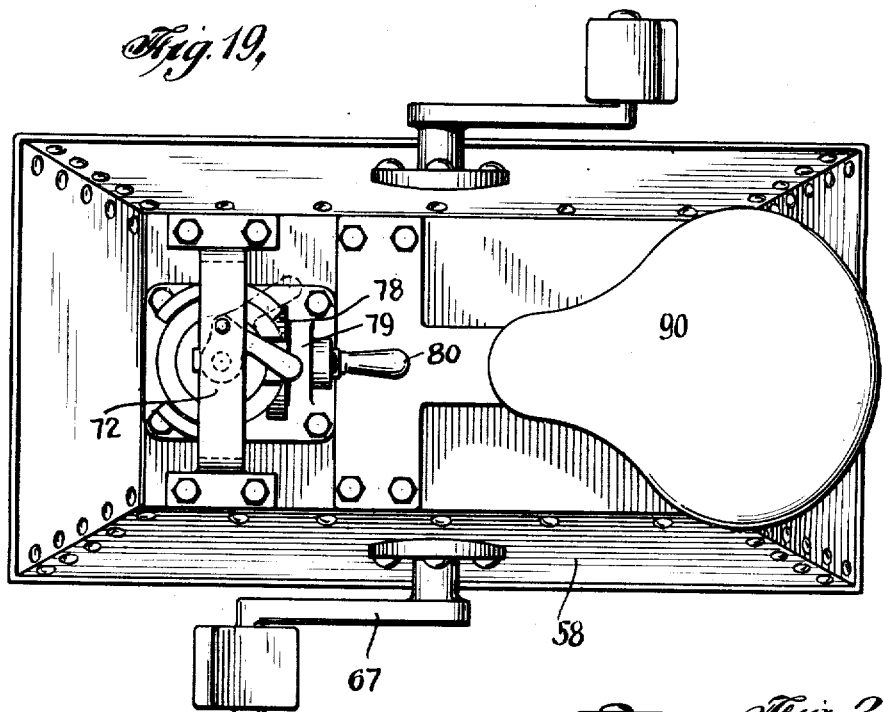
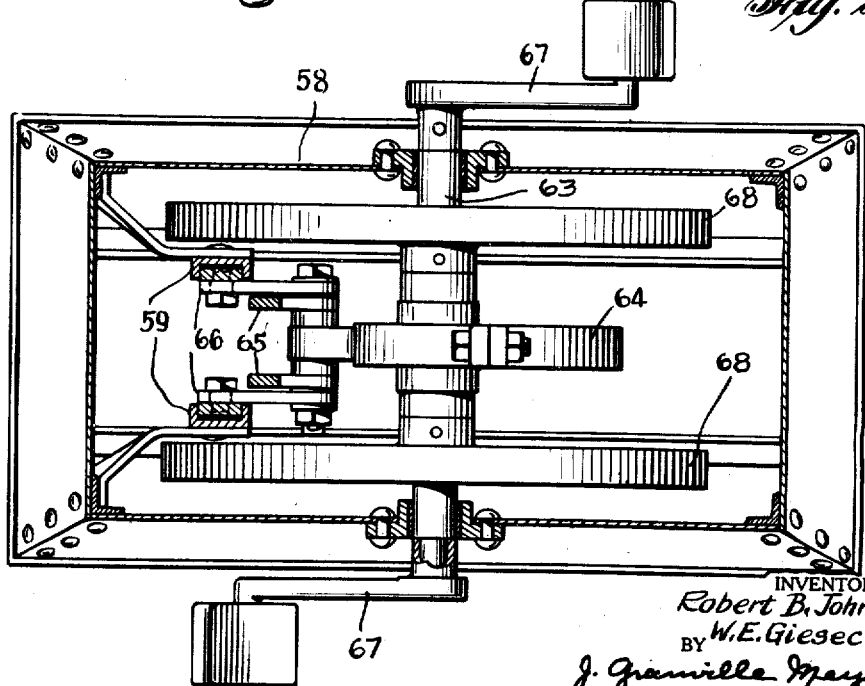

Patented June 1, 1926.

1,586,749

UNITED STATES PATENT OFFICE.

ROBERT B. JOHNSTON, OF COLLINGSWOOD, NEW JERSEY, AND WILLIAM E. GIESECKE, OF NEW YORK, N. Y., ASSIGNORS TO CHARLES G. WILSON COMPANY, INC., OF NEW YORK, N. Y., A CORPORATION OF NEW YORK.

NUT-SHELLING APPARATUS.

Application filed July 10, 1925. Serial No. 42,649.

This invention is an improvement in nut shelling apparatus, and more particularly in apparatus designed for the shelling of palm nuts, such as those of the Babassu palm.

These nuts are the product of the Babassu palm, each containing a number of kernels, varying in number from one to six. The kernels are held in cells in the shell of the nut, the cells being separated by wing like extensions in the shell.

The shells are composed of pericarp, mesocarp, and endocarp, the latter being very hard and dense, a homogeneous extremely hard substance, interspersed with fibers running longitudinally of the nut. The pericarp is of a fibrous nature, tough and resistant, while the mesocarp is amorphous and relatively soft.

The external aspect of a normal nut is similar to that of a large lemon. The blunt or round end of the nut is the unattached end, differing thus from the lemon, in which the corresponding end is attached to the flower stem. The wings which separate the kernel cells of the nut spring from a central column or mast of a very fine grained hard character, somewhat more brittle yet harder than the material of the wings or that of the endocarp.

The coarse fibers of the pericarp together with the fibers traversing the endocarp or hard shell form, at the butt end of the nut, a vaulted covering protecting the eyes of the nut. The endocarp fibers at the tip end become amorphous during the growth of the nut to a very large extent and there form a shell material less hard than the endocarp but harder than the peri- or mesocarp.

The original tender fiber structure of the central column and its wings, or kernel cell partitions, disappears almost entirely within the mast and the wings at the tip end during the ripening of the nut, and it then assumes the same texture as do the fibers of the endocarp proper; but, at the butt end, they are plainly visible and extend out through the butt end "acorn" in radial lines as short stiff bristles indicating clearly the interior position of the kernel cell division walls.

Because of the fact that the number of kernels in the nut, while variable, never exceeds six, it is desirable to split all nuts radially into six segments thereby to positively release every kernel. Heretofore this has been done by blades diverging radially from a common center, and contoured to provide a seat for the nut end at the common center. The cutting has been a combination of incising and splitting, the incising being substantially altogether in the enclosing wall of the shell.

Usually the cutting is done by moving blades longitudinally of the nut from the butt end, against counter-pressure at the tip or pointed end, and because of the construction and arrangement of the cutter head, and the manner of its use, the maximum efficiency of the blades is not exerted on the central column or mast, which is the most resistant part of the nut, so far as regards compression stresses.

One of the primary objects of the present invention is the provision in a machine of the class described, of mechanism operating in synchronism with the cutter heads, to cut and split the central mast or column.

Another object is to provide a new and improved form of cutter head, wherein the blades are independently removable from the head, for grinding or purposes of repair.

Another object is the provision of a moving means for the heads, arranged to produce a maximum of power at the end of the head movement.

Another object is the provision of a means for cutting and splitting the nut, including a plurality of cooperating cutter heads moving in the same direction when operating to cut the nut, and mounted to yield one with respect to the other.

Another object is the provision of mechanism including heads for engaging the ends of the nut, one of which is a cutter head, for imparting angular movement for one of the heads, controlled by the movement of the heads toward and from each other.

With these and other objects in view, the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings:—

Fig. 1 is a side view of one embodiment of the invention.

Fig. 2 is a front view.

Fig. 3 is a side elevation with a part in section of the upper cutter head.

Fig. 4 is a similar view of the lower cutter head and its mounting.

Fig. 5 is a top plan view of the lower head.

Fig. 6 is a section on the lines 6—6 of Fig. 4.

Fig. 7 is a perspective view of the cracked or open nut.

Fig. 8 is a vertical section of the nut before cracking.

Figs. 9 and 10 are sections on the lines 9—9 and 10—10 respectively of Fig. 8.

Fig. 11 is a perspective view of the opened nut with the central column or mast removed.

Fig. 12 is an enlarged detail in perspective of alternate forms of the cutter heads.

Fig. 13 is an enlarged detail in perspective of an alternate form of lower cutter head.

Fig. 14 is a similar view of another alternate construction.

Fig. 15 is a vertical section of the embodiment shown in Fig. 14.

Fig. 16 is a side view of an alternate construction of machine.

Figs. 17 and 20 are sections on the lines 17—17 and 20—20 of Fig. 16.

Fig. 18 is a section on the line 18—18 of Fig. 17.

Fig. 19 is a plan view of Fig. 16.

The nut upon which the improved machine is designed to operate is shown in Figs. 7 to 11 inclusive. It will be noticed referring to these figures that the nut A is substantially lemon shaped, having a rounded end $a$ and a pointed end $a'$. The outer layer of the shell or pericarp B is of a fibrous nature as before stated, tough and resistant. The mesocarp indicated at C is relatively soft and of an amorphous nature. The endocarp D is very hard, dense, homogeneous and stone like, but interspersed with wood like fibres, running longitudinally thereof.

The central column $d$ is of the same general nature as the remainder of the endocarp, but of a finer grain, and somewhat more brittle. The kernel cells F are oblong structures as shown, each containing a kernel G which is the valuable portion of the nut. The central mast or column $d$ is connected to the portion of the endocarp outside of the kernel cells by wings $d'$ extending between the adjacent cells.

The problem involved is to open the nut in such manner that all of the kernels, rarely if ever more than six in number, are exposed, so that they may be easily removed. Hence the nuts should be split into at least six sections, that is there should be six incisions to open the maximum number of cells which may be found in the nut.

In the present invention, the arrangement of the machine is such that each nut A is partially separated into a number of similar sections $a^2$ connected at the pointed end $a'$ of the nut, and with the sections spread apart at the free ends as shown in Fig. 7. Thus the kernels F are properly freed from the several sacs or cells. The cutting or splitting takes place progressively.

The preferred mechanism for opening the nut includes opposed heads, at least one of which is provided with blades for cutting and splitting the nut, together with means for imparting relative movement to the heads, and means for imparting angular movement to one of the heads, thereby to spread the cluster of sections into which the nut is split by the cutters of the head.

In the embodiment of the invention shown in Figs. 1 and 2, the machine includes a substantially rectangular open frame 1, having at an upper corner means indicated at 2 for connecting it to the trunk 3 of a tree, or other fixed support, and means 4 at the adjacent lower corner to bear against the trunk. The means 2 in the present instance is a chain, connected at one end to the frame, adapted to encircle the trunk, and adjustably connected at the other end to the frame. The means 4 may be as shown merely a stirrup or fork bearing against the trunk. It will be obvious that any vertical fixed column may be used to support the frame.

The side member of the frame opposite that which bears against the support of the frame is constituted by a pair of guides 5, and a sleeve 6, to be described, which guides the upper cutter, head is mounted between the guides. A toggle composed of upper and lower members 7 and 8 respectively connects the upper cutter with the top of the frame, and the linked ends of the toggle members are pivoted to a follower 9 on a cam 10 secured to a cam shaft 11 which has connected therewith a hand wheel 12 for convenience in rotating the same.

The lower cutter head is mounted in a sleeve 13 supported by the guides 5, and the sleeves 6 and 13 are coaxial. The sleeve 13 is fixed, and the arrangement of the sleeve 6 is such that when the shaft 11 is rotated, the upper cutter in sleeve 6 will be alternately moved toward and from the sleeve 13. The nut 14 to be cut is placed between the cutters, substantially co-axial therewith, so that when the cutters are moved toward each other the nut will be clamped between the heads and will be cut by the cutters into a plurality of sections.

In practice the cutting is usually done by one of the heads, the other serving more the function of a stop or counter-presser than that of the cutter, and the cutting blades may be omitted from one head without greatly impairing the efficiency of the machine.

In the present instance the upper cutter head comprises a base 15 having a reduced hollow stem 16 which is received in a reduced portion of the sleeve bore, and held in place by a set screw 17. The base has a plurality of blades 18, which may be of any desired number, usually from three to six, and these blades as indicated more particularly in Fig. 3 are wedge shaped from below upward, and from within outward, that is the thinnest parts or cutting edges of the blades are at the bottom and inner edges.

The lower cutter head is preferably adjustable axially of the sleeve 13, and also mounted to move angularly with respect thereto. A post or column 19 is mounted in the sleeve 13, and the upper end of the column has an annular rib 20. A stepped cam member 21 is supported by the frame co-axially with the sleeve and the post, and a pin 22 extending radially from the post rests upon the steps of the cam. It will be obvious that the position of the post will be determined by the height of the step upon which the pin rests, and by engaging the pin with different steps, the post may be adjusted vertically.

The head includes a support 23 in the form of a substantially cylindrical block, having its upper end reduced and externally threaded as shown at 24, and it is rotatably supported on the top of the post, a ball bearing 25 being interposed between the post and the support. Referring to Fig. 2 it will be seen that both support and post have reduced portions extending into the ball bearing race to properly center the parts.

The cutter head proper may be held in the support in any desired manner, and it may be an integral or built up structure as preferred. In Figs. 4 and 6, the head is shown as a built up structure, comprising a plurality of blades 26, and spacing blocks 27 between the blades. The blades and blocks are assembled in a circular recess 28 in the top of the support 23, which may be considered as a base for the head. Referring to Fig. 6, it will be noticed that each blade and each block has a marginal flange 26$^a$ and 27$^a$ respectively at its base end, and the blades, blocks and flanges are so shaped and so proportioned that they may be assembled into a structure circular in cross section, and of such dimensions when so assembled that the base ends of the blades and blocks will just fill the recess 28 as shown in Fig. 4. The assemblage is held in place on the support or base, by means of a collar 29 threaded onto the portion 24 of the support. The collar overlies the flange portions 26$^a$ and 27$^a$ as shown, and holds the assemblage firmly together.

The long axes of the blades are parallel with the axis of the support, and this is true also of the blades 18 of the upper head. The cutting edges of the blades 26, and of the blades 18, are at the free ends and inner sides of the blades, and the blades gradually increase in thickness from the said edges. The blades are preferably proportioned from the cutting edges on substantially the same lines as an ax blade, and it will be noticed that the adjacent faces of adjacent blades diverge outwardly so that the blade faces are further apart at the perimeter of the head than anywhere else. The spacing members 27 are beveled outwardly and rearwardly as shown, so that there is a free escape for the sections of the nut between the blades and over the spacing members.

In both heads the blades are contoured to provide a seat or pocket for the nut ends between the blades and at the center of the head, and the said contouring provides for an area at the axis of each cutting head where there is no cutting action on the part of either blades 18 or 26. In the upper head this area is occupied by a knock out pin 30, the head having an axial bore in which the pin is slidable. The pin has an annular rib 31 at its inner end, which limits the outward sliding movement of the pin, the lower end of the bore being reduced for engagement by the rib. A spring 32 is arranged between the pin, and a holding screw or stop 33 threaded into the upper end of the bore. The spring permits the pin to yield under the pressure of the nut while it is being cracked, but reacts to dislodge the nut when the pressure of the lower head is relaxed.

The said area in the lower end is occupied by an auxiliary cutter head. Referring to Fig. 4 it will be seen that this auxiliary cutter head is in the form of a post or column 34, mounted in an axial bore of the lower head. The bore is shown polygonal in cross section, and the post is shaped to fit, thereby to prevent angular movement of the post. The upper end of the post is substantially conical as shown, and it has a number of blades 35 whose cutting edges face inwardly and upwardly, and the said blades are wedge shaped as shown. In the present instance the blades are three in number, though it is obvious that they might be in greater number if desired. Three however is usually sufficient. The upper cutter head may carry only three blades, that is half the number of the lower head. The post is held in lower head in any suitable or desired manner, as for instance by means of a nut 36 engaging a threaded stem 37 on the post. The post has an annular rib 38 intermediate its ends, which prevents the outward movement of the blades and spacing blocks. The parts are easily disassembled by removing the collar 29 unscrewing nut 36 and forcing out column 34.

As shown in Fig. 6 the lower cutter head is in the present instance a built up structure. The blades 26 are independent blades, as are also the spacing blocks 27. The blades and blocks are set on the head in the manner shown in Fig. 6, and they are held in assembled position, by the collar 29.

In the lower head the said area at the axis of the head is occupied by an auxiliary cutter head, for operating on the central mast or column of the nut. Referring to Figs. 4 and 6 it will be seen that this auxiliary head 34 is shown as a polygonal bore shaped to fit within the polygonal opening left when the blades and spacing blocks are assembled as above described. The lower end of the bar is reduced and threaded as indicated at 37, for engagement by a nut 36, which holds the bar in place in the assembled head. The bar has an annular rib 38 which engages inwardly extending ledges on the blades, to limit the movement of the bar toward the nut, and the upper end of the bar is provided with a plurality of blades 35, in the present instance, three, registering with the alternate blades of the main head.

Referring to Fig. 4 it will be noticed that the cutting edges of the blades 35 face inwardly and upwardly, and referring to Fig. 5 it will be seen that the blades are wedge shaped. In practice the blades 35 are modeled on the usual ax blade, which is the accepted form for cutting and splitting. The blades and spacing blocks of the lower head when assembled are held together by the auxiliary cutter, and when seated in the recess 28 of the support 23, and engaged by the collar 29, there is no possibility of displacement of any of the parts. It will be understood however that the lower head may be an integral structure, if this construction is found preferable.

The support 23 for the lower head is angularly movable in the sleeve 13, being supported by the ball bearing 25 before mentioned. The purpose of this mounting, is to enable the cut nut to be twisted, thereby to separate the cluster sections in the manner shown in Fig. 7. The support 23 and the head are moved angularly, by means of a handle 40 rigid with the support, and extending through a slot 41 in the sleeve 13.

The operation of the machine just described, is as follows. With the parts in the position of Figs. 1 and 2, a nut 14 is placed on the lower head, with the blunt end thereof in the seat. The nut naturally takes this position, with the pointed or tip end positioned to register with the seat in the upper head. The hand wheel 12 is now turned to cause the upper head to descend, and the nut is forced downward upon the blades 26 and 35. The blades 26 incise and simultaneously split the shell, while the auxiliary blades 35 perform a like function with the central mast or column. Referring to Fig. 4 it will be seen that the blades 35 are at a level considerably below that of the blades 26, so that in operating on the nut the blades 26, cut the outer endocarp while blades 35 cut the column end. While the nut is still pressed between the heads, the handle 40 is operated to impart a degree of rotation to the lower head, thus spreading the sections of the nut, which remain connected at the upper end of the nut. The upper cutter is now moved upward, and the nut is dislodged, by means of a lever 41ª, which is hinged to one of the guides 5 as indicated at 42.

Since little or no cutting action is necessary on the part of one head, the blades of one head may be dispensed with, the said head serving merely as a stop, and gripper during the twisting of the nut. Preferably however the one head is provided with blades, but the said blades may be few in number, half the number of the other head being sufficient. As previously stated the number of kernels in the nut varies, but six is the maximum, and it is usual to provide six blades, in order that every kernel cell of the maximum celled nut may be opened. In some instance however it may be desirable to use a smaller number of blades on both heads, as for instance in the construction of Fig. 12, the upper head indicated generally at 42 and the lower head indicated generally at 43 are provided with three blades 44 and 45 respectively. The lower head has the auxiliary cutter 46 as above mentioned, and both heads are otherwise the same as those shown in Figs. 3 and 4, and similarly mounted.

In Fig. 13 an alternate construction of head is shown. This head is composed of sets of main blades, a set of long blades 47 and a set of short blades 48, the blades of the sets alternately arranged as shown, and separated by the usual spacing blocks 49. The auxiliary cutter head indicated generally at 50 is arranged at the axis of the head as above described, and the blades thereof are in register with the main blades 48. The blades are assembled and supported in the same manner as previously described.

In Figs. 14 and 15 an alternate construction is shown, wherein the auxiliary head is resiliently supported to yield with respect to the main head, and to function by reaction as a knock out pin. In this construction, the main blades 51 and spacing blocks 52 are similar to those of Fig. 4, assembled in the same manner, and connected to the support 53 by the threaded collar 54. The auxiliary cutter includes a bar 55 which is slidable at the axis of the head, between the blades and blocks. The support 53 is provided with a bore 56 in which the bar slides, and the upper end of the bore is enlarged to receive a rib 57 on the bar. A spring 58 encircles the bar below the rib and acts normally to force the auxiliary cutter upward. It will be obvious that when the nut is pressed against the auxiliary cutter it may move downward to an extent determined by the strength of the spring. It will be obvious that the relative movement of the auxiliary cutter and main cutter might be obtained in any desired manner.

In the embodiment of the invention shown in Figs. 16 to 20 inclusive, a construction is shown which is self supported, and wherein the twisting of the nut to spread the sections is mechanically performed. This embodiment includes a base 58, which in the present instance is of sheet metal, and the frustum of a pyramid. A pair of channel shaped guides 59 is supported within the base in vertical position, and in spaced relation, and with their channels adjacent. Bars 60 are mounted to slide in guides, the said bars being connected at their lower ends, by a cross pin or shaft 61, and at their upper ends by a sleeve 62, and which supports the upper cutter head. A crank shaft 63 is journaled transversely of the base, and the said shaft carries a cam encircled by a follower 64. The adjacent ends of a pair of toggle members 65 and 66 is pivoted to the follower, and the remote ends of the toggle members 66 are pivotally connected to the bars 60, and toggle members 65 to a shaft 65ᵃ supported by the guides 59. A pedal 67 is secured to each end of the shaft 63, and it will be obvious that by means of the pedals, the cam shaft 63 is rotated counter clockwise to straighten or bend the toggle alternately. The bars 60 are slotted longitudinally as indicated at 60ᵃ, and the shaft 65ᵃ extends through the slots, so that the vertical movement of the bars 60 is not interfered with by the shaft. When the toggle is straightened, the sleeve 62, in which is mounted the upper cutter head, is moved upward away from the lower head, supported in a manner to be described. Preferably the shaft 63 carries fly wheels 68 for stabilizing the operation thereof.

The upper cutter head 69 may be of any suitable or desired construction, preferably one of those already described, having the knock out pin 70 limited in its movement by a pin and slot connection 71 with the sleeve. A yoke is supported by the base surrounding the bars 60, and the body 72 of the yoke extends transversely over the upper head, the arms 73 of the yoke being secured to the base as shown. This yoke body carries an elbow lever 74, which is pivoted to the body as shown. One arm of the elbow lever is a handle, and the other is adapted to be interposed into position to engage the knock out pin 70 which extends above the sleeve 62, at the end of the upward movement of the upper head, thereby to positively operate the pin downwardly. The lever may be swung into or out of position by means of the handle.

The lower head 76 which may be of any desired construction, preferably one of those previously described is mounted on a support 77, in the same manner as the construction of Fig. 1, and it is adjusted vertically by means of a cam or eccentric 78 journaled in the support 79 at the base, and rotated by means of a crank 80. A lug 81 extending laterally from the support 77 rests upon the periphery of the cam, the lug extending through a slot in the sleeve wall.

In Fig. 17 the lower head is shown in its lowermost position. To elevate the head, the cam is turned in either direction. Latch mechanism is provided for holding the cam in adjusted position. The said mechanism includes a spring pressed pin 82 in the support 79 which is adapted to engage one of a number of openings 83 in the face of the cam adjacent to the support 79, and concentrically arranged with respect to the axis 84 of the cam.

In the construction of Figs. 1 and 2, the lower head is moved angularly to spread the nut sections manually. In the present construction, such angular movement is obtained mechanically. The support 77 has three radial pins 85, 85ᵃ and 85ᵇ. The pins 85 and 85ᵇ are approximately opposite, while the pin 85ᵃ is between them, and somewhat nearer to the pin 85. Each of the arms 60 has cams to cooperate with the pins 85, 85ᵃ, and 85ᵇ. The arm 60 at the left of Fig. 17, has a cam 86 for cooperating with the pin 85ᵇ. The arm 60 at the right of Fig. 17 has a cam 87 for cooperating with the pin 85ᵃ, and a cam 88 for cooperating with the pin 85.

The cams 86, 87 and 88 are spaced vertically from each other, and on the downward movement of the upper head, the cam 88 first engages the pin 85. An angular movement to the extent of about 15 degrees is imparted to the lower head, this being sufficient to twist the nut. A moment later the cam 87 engages the pin 85ᵃ and imparts a reverse angular movement to the cutter head to the extent of about 30 degrees. The cam 86 has meanwhile moved past the pin 85ᵇ, which is out of the path of movement of the cam. When the upper head begins to move upward, cam 86 engages the pin 85ᵇ and again moves the lower head angularly to the extent of about 15 degrees thus restoring it to normal position, which is substantially the position indicated in Fig. 18. Should the nut stick in the upper head, it will be dislodged, when the knock out pin engages the elbow lever 70.

The operation of the construction just described is as follows. The operator seated upon the saddle 90, by means of the pedals arranges the parts as shown in Fig. 17. A nut is now placed in the seat of the lower head, and the pedals are operated to bend the toggle. The nut is now clamped between the heads by turning the lower cam 78 with handle 80, and continued movement causes the toggles to straighten and forces the blades to cut and split the nut into a plurality of sections, corresponding in number to the number of blades, and connected at their tops into cluster formation.

As the upper head nears the end of its downward movement, the lower head is turned angularly to twist the nut, thereby to spread the sections. The continued rotation of shaft 63 then moves the upper head upward, and the nut is ejected. The mechanism for moving the lower head vertically is utilized to clamp the nuts between the heads, and is also used during the cutting and the splitting of the nut either synchronously with the movement of the lower head, or in alternation with such movement, depending upon the character of the nut.

It may be noticed that with the present construction, the greatest power afforded by the toggle is after the heads have engaged the nut, and the power increases until the end of the downward movement. At the beginning of the movement, when speed with little power is desirable, the toggle arrangement is such as to give high speed and low power. The speed gradually decreases, while the power gradually increases, owing to the straightening of the toggles.

In some cases it may be advisable to make the auxiliary cutter rotatable in the lower head. This may obviously be done by making the auxiliary head cylindrical, with a bore in the lower head to fit. The auxiliary head when of this type, may turn when subjected to torsional stresses in cutting.

The resilient mounting of the auxiliary cutter head, as shown for instance in Fig. 15, allows the said head to automatically adjust itself in height to the shape of the nut, so that the nut will set evenly upon the seat of the lower head.

The object in first imparting a 15 degree twist to the nut, and afterwards a 30 degree twist in the opposite direction, is to thoroughly spread the sections without risk of damage to the kernels, by twisting the head 15 degrees from normal in one direction, and then 15 degrees from normal in the opposite direction. That is the nut is twisted or moved angularly a total distance of 30 degrees, but only half this distance from the normal in either direction.

In the Fig. 13 construction, the cutting edges of the blades 48 face forwardly and somewhat outwardly. The blades 47 first engage the nut, and cut from the outside toward the center and tip of the nut, cutting and splitting the nut in three sections. The blades 48 engage the nut after the cutting and splitting action of the blades 47 is well advanced, and the said blades 48 cut each of the three section into two parts, cutting from within outward and forward. This results in a considerable saving of power.

It will be understood that in operation the shaft 63 is continuously rotated in one direction by the pedals. It will be obvious that a prime mover might be connected directly with the shaft 63 if desired, thus leaving the attention of the operator free to attend to the placing of the nuts.

The adjustment of the lower head serves two purposes,—first, to adjust to nuts of different lengths, and, second, to compensate for blade penetration. It will be understood that the nuts vary in length, from two to five inches, and by means of the cam 78, the lower head may be stepped up, in the construction of Figs. 16 to 20, without relaxing the pressure of the upper head. The contour of the cam permits this adjustment. Or the construction may be utilized to compensate for a short stroke of the movable head, the upper head of Figs. 16 to 20. With a short stroke, for instance, and a long nut, the movement of the lower head may be utilized to complete the splitting of the nut after the initial cutting by the movement of the upper head.

We claim:

1. In a nut shelling machine, heads mounted for relative movement toward and from each other, each head having a seat for the end of the nut, one head a cutter, and an auxiliary cutter head in the seat thereof.

2. In a nut shelling machine, heads mounted for relative movement toward and from each other, each head having a seat for the end of the nut, one head a cutter, and an auxiliary cutter head in the seat thereof, the cutter heads movable axially with respect to each other.

3. In a nut shelling machine, heads mounted for relative movement toward and from each other, each head having a seat for the end of the nut, one head a cutter, and an auxiliary cutter head in the seat thereof, one of said cutter heads resiliently supported to yield with respect to the other.

4. In a nut shelling machine, heads mounted for relative movement toward and from each other, each head having a seat for the end of the nut, one head a cutter, and an auxiliary cutter head in the seat thereof, the cutter heads movable axially with respect to each other, and a resilient connection between the cutter heads.

5. In a nut shelling machine, heads mounted for relative movement toward and from each other, each head having a seat for the end of the nut, one head a cutter, and an auxiliary cutter head in the seat thereof, each cutter head including blades radially arranged with respect to the seat.

6. In a nut shellling machine, heads mounted for relative movement toward and from each other, each head having a seat for the end of the nut, one head a cutter, and an auxiliary cutter head in the seat thereof, each cutter head including blades radially arranged with respect to the seat, the cutting edges of the head blades inclining inwardly and rearwardly toward the seat.

7. In a nut shelling machine, heads mounted for relative movement toward and from each other, each head having a seat for the end of the nut, one head a cutter and an auxiliary cutter head in the seat thereof, each cutter head including blades radially arranged with respect to the seat, the cutting edges of the head blades inclining inwardly and rearwardly toward the seat, and the cutting edges of the blades of the auxiliary head inclining rearwardly and inwardly.

8. In a nut shelling machine, a pair of heads, mounted to move toward and from each other, each head having a seat for the end of a nut, one head a cutter having blades radial to the seat, and an auxiliary cutter head in the seat, said cutter heads mounted for relative axial movement, and resiliently connected.

9. In a nut shelling machine, a pair of heads, mounted to move toward and from each other, each head having a seat for the end of a nut, one head a cutter having blades radial to the seat, and an auxiliary cutter head in the seat, said cutter heads mounted for relative axial movement, and resiliently connected, an auxiliary cutter head including a set of radial blades.

10. In a nut shelling machine, a cutter head including a seat for the nut and a set of blades diverging radially therefrom, and an auxiliary cutter head including radially arranged blades in the seat, the cutter heads mounted for relative axial movement.

11. In a nut shelling machine, a cutter head including a seat for the nut and a set of blades diverging radially therefrom, and an auxiliary cutter head including radially arranged blades in the seat, the cutter heads mounted for relative axial movement, the auxiliary head resiliently mounted.

12. In a nut shelling machine, a cutter head including a seat for the nut and a set of blades diverging radially therefrom, and an auxiliary cutter head including radially arranged blades in the seat, the cutter heads mounted for relative axial movement, and means for engaging the other end of the nut to provide counter-pressure.

13. In a nut shelling machine, a cutter head including a seat for the nut and a set of blades diverging radially therefrom, and an auxiliary cutter head including radially arranged blades in the seat, the cutter heads mounted for relative axial movement, the cutter blades wedge shaped, longitudinally and radially.

14. In a nut shelling machine, a cutter head including a seat for the nut and a set of blades diverging radially therefrom, and an auxiliary cutter head including radially arranged blades in the seat, the cutter heads mounted for relative axial movement, the cutter blades wedge shaped, longitudinally and radially, and the adjacent faces of adjacent blades diverging outwardly to provide flaring passages between the blades.

15. In a nut shelling machine, a cutter head including a seat for the nut and a set of blades diverging radially therefrom, and an auxiliary cutter head including radially arranged blades in the seat, the cutter heads mounted for relative axial movement, the cutter blades wedge shaped, longitudinally and radially, the cutter head beveled rearwardly between the blades to wedge the nut sections outward.

16. In a nut shelling machine, heads mounted for relative movement toward and from each other, each having a seat for the end of the nut, one head provided with radially arranged cutting and splitting blades, means to impart relative movement to the heads with increasing power and lessening speed as they near each other, and an auxiliary cutter head in the seat of the last named head.

17. In a nut shelling machine, heads mounted for relative movement toward and from each other, each having a seat for the end of the nut, one head provided with radially arranged cutting and splitting blades, means to impart relative movement to the heads with increasing power and lessening speed as they near each other, and an auxiliary cutter head in the seat of the last named head, said last named heads relatively movable and resiliently connected.

18. In a nut shelling machine, a pair of heads mounted for relative movement toward and from each other, each head having a seat for the end of the nut, one head having a set of radially arranged cutting and splitting blades encircling the seat, and an auxiliary cutter head operating on the center of the nut in synchronism with the first named head.

19. In a nut shelling machine, a pair of heads mounted for relative movement toward and from each other, each head having a seat for the end of the nut, one head having a set of radially arranged cutting and splitting blades encircling the seat, means for imparting relative movement to the heads, and means operated by the movement of the heads toward and from each other, for imparting angular movement to one of the heads for the purpose specified.

20. In a nut shelling machine, a pair of heads mounted for relative movement toward and from each other, each head having a seat for the end of the nut, one head having a set of radially arranged cutting and splitting blades encircling the seat, means for imparting relative movement to the heads, and means operated by said movement to impart angular movement to one of the heads in opposite directions.

21. A cutter head for shelling nuts, including a set of a selected number of independent blades, means to hold the blades together in radially assembled relation and spaced apart from each other at substantially equal angles and with an axial bore and an auxiliary cutter in the bore.

22. A cutter head for shelling nuts, including a set of a selected number of independent blades, means to hold the blades together in radially assembled relation and spaced apart from each other at substantially equal angles, and with an axial bore to receive an auxiliary cutter.

23. A cutter head for shelling nuts, including a set of a selected number of independent blades, means to hold the blades together in radially assembled relation and spaced apart from each other at substantially equal angles, with an axial bore to receive an auxiliary cutter, and an auxiliary cutter in the bore, spring supported to yield axially of the cutter head.

24. A cutter head for shelling nuts including a set of a selected number of independent blades, means to space the blades apart radially at substantially equal angles, and releasable means to clamp the blades and the spacing means together.

25. A cutter for shelling nuts, including a set of a selected number of independent blades, means to space the blades apart in radial relation and at substantially equal angles, and with an axial bore, and releasable means to clamp the blades and the spacing means together.

Signed at Gloucester City in the county of Camden and State of New Jersey this 2nd day of July A. D. 1925.

ROBERT B. JOHNSTON.
WILLIAM E. GIESECKE.

ward and from each other, each head having a seat for the end of the nut, one head having a set of radially arranged cutting and splitting blades encircling the seat, means for imparting relative movement to the heads, and means operated by the movement of the heads toward and from each other, for imparting angular movement to one of the heads for the purpose specified.

20. In a nut shelling machine, a pair of heads mounted for relative movement toward and from each other, each head having a seat for the end of the nut, one head having a set of radially arranged cutting and splitting blades encircling the seat, means for imparting relative movement to the heads, and means operated by said movement to impart angular movement to one of the heads in opposite directions.

21. A cutter head for shelling nuts, including a set of a selected number of independent blades, means to hold the blades together in radially assembled relation and spaced apart from each other at substantially equal angles and with an axial bore and an auxiliary cutter in the bore.

22. A cutter head for shelling nuts, including a set of a selected number of independent blades, means to hold the blades together in radially assembled relation and spaced apart from each other at substantially equal angles, and with an axial bore to receive an auxiliary cutter.

23. A cutter head for shelling nuts, including a set of a selected number of independent blades, means to hold the blades together in radially assembled relation and spaced apart from each other at substantially equal angles, with an axial bore to receive an auxiliary cutter, and an auxiliary cutter in the bore, spring supported to yield axially of the cutter head.

24. A cutter head for shelling nuts including a set of a selected number of independent blades, means to space the blades apart radially at substantially equal angles, and releasable means to clamp the blades and the spacing means together.

25. A cutter for shelling nuts, including a set of a selected number of independent blades, means to space the blades apart in radial relation and at substantially equal angles, and with an axial bore, and releasable means to clamp the blades and the spacing means together.

Signed at Gloucester City in the county of Camden and State of New Jersey this 2nd day of July A. D. 1925.

ROBERT B. JOHNSTON.
WILLIAM E. GIESECKE.

---

Certificate of Correction.

It is hereby certified that the name of the assignee in Letters Patent No. 1,586,749, granted June 1, 1926, upon the application of Robert B. Johnston, of Collingswood, New Jersey, and William E. Giesecke, of New York, N. Y., for an improvement in "Nut-Shelling Apparatus," was erroneously written and printed as "Charles G. Wilson Company, Inc., of New York, N. Y., a corporation of New York," whereas said name should have been written and printed as *Charles T. Wilson Company, Inc., of New York, N. Y., a corporation of New York,* as shown by the records of assignments in this office; and that the said Letters Patent should be read with this correction therein that the same may conform to the record of the case in the Patent Office.

Signed and sealed this 5th day of October, A. D. 1926.

[SEAL.]

M. J. MOORE,
*Acting Commissioner of Patents.*

Certificate of Correction.

It is hereby certified that the name of the assignee in Letters Patent No. 1,586,749, granted June 1, 1926, upon the application of Robert B. Johnston, of Collingswood, New Jersey, and William E. Giesecke, of New York, N. Y., for an improvement in "Nut-Shelling Apparatus," was erroneously written and printed as "Charles G. Wilson Company, Inc., of New York, N. Y., a corporation of New York," whereas said name should have been written and printed as *Charles T. Wilson Company, Inc., of New York, N. Y., a corporation of New York*, as shown by the records of assignments in this office; and that the said Letters Patent should be read with this correction therein that the same may conform to the record of the case in the Patent Office.

Signed and sealed this 5th day of October, A. D. 1926.

[SEAL.]

M. J. MOORE,
*Acting Commissioner of Patents.*